United States Patent
Oda et al.

(10) Patent No.: US 7,143,206 B2
(45) Date of Patent: Nov. 28, 2006

(54) METHOD FOR CONTROLLING DATA TRANSFER UNIT HAVING CHANNEL CONTROL UNIT, STORAGE DEVICE CONTROL UNIT, AND DMA PROCESSOR

(75) Inventors: Takashi Oda, Odawara (JP); Teruo Goto, Oi (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 10/752,274

(22) Filed: Jan. 5, 2004

(65) Prior Publication Data
US 2005/0050244 A1 Mar. 3, 2005

(30) Foreign Application Priority Data
Sep. 3, 2003 (JP) ............... 2003-311639

(51) Int. Cl.
G06F 13/00 (2006.01)
G06F 12/00 (2006.01)
(52) U.S. Cl. ............. 710/22; 710/33; 710/36; 710/38; 710/68; 711/113; 711/114; 711/115
(58) Field of Classification Search ........... 710/22, 710/33, 68, 36, 38; 711/113–115
See application file for complete search history.

(56) References Cited

U.S. PATENT DOCUMENTS

| | | | |
|---|---|---|---|
| 5,465,380 A | | 11/1995 | Hamanaka et al. |
| 5,535,384 A | * | 7/1996 | Kasahara ............. 707/7 |
| 5,584,039 A | | 12/1996 | Johnson et al. |
| 5,652,857 A | * | 7/1997 | Shimoi et al. .......... 711/113 |
| 5,706,034 A | * | 1/1998 | Katsura et al. .......... 345/539 |
| 6,134,642 A | | 10/2000 | Holmes et al. |
| 6,189,078 B1 | | 2/2001 | Bauman et al. |
| 6,470,432 B1 | | 10/2002 | Ozawa et al. |
| 6,502,167 B1 | * | 12/2002 | Tanaka et al. .......... 711/114 |
| 6,578,108 B1 | | 6/2003 | Fujimoto et al. |
| 6,922,743 B1 | * | 7/2005 | Mizuno ............. 710/38 |
| 2002/0156944 A1 | | 10/2002 | Benhase et al. |
| 2002/0184481 A1 | | 12/2002 | Bish et al. |
| 2003/0006992 A1 | | 1/2003 | Mino et al. |

FOREIGN PATENT DOCUMENTS

JP 63-296155 12/1988

* cited by examiner

Primary Examiner—Tammara Peyton
(74) Attorney, Agent, or Firm—Townsend and Townsend and Crew LLP

(57) ABSTRACT

Embodiments of the invention relate to systems and methods for controlling data transfer. In one embodiment, a method for controlling data transfer comprises receiving a data transfer request from an external device; and writing data transfer information based on the data transfer request into a local memory by a processor. The data transfer information includes information indicating a storage position in a buffer memory and information indicating a storage position in a cache memory. The method further comprises reading the data transfer information from the local memory by a data transfer control processor which is connected with the processor via a bus; and transferring the data stored in one of the buffer memory and the cache memory into the other one of the buffer memory and the cache memory, according to the data transfer information, by the data transfer control processor.

30 Claims, 12 Drawing Sheets

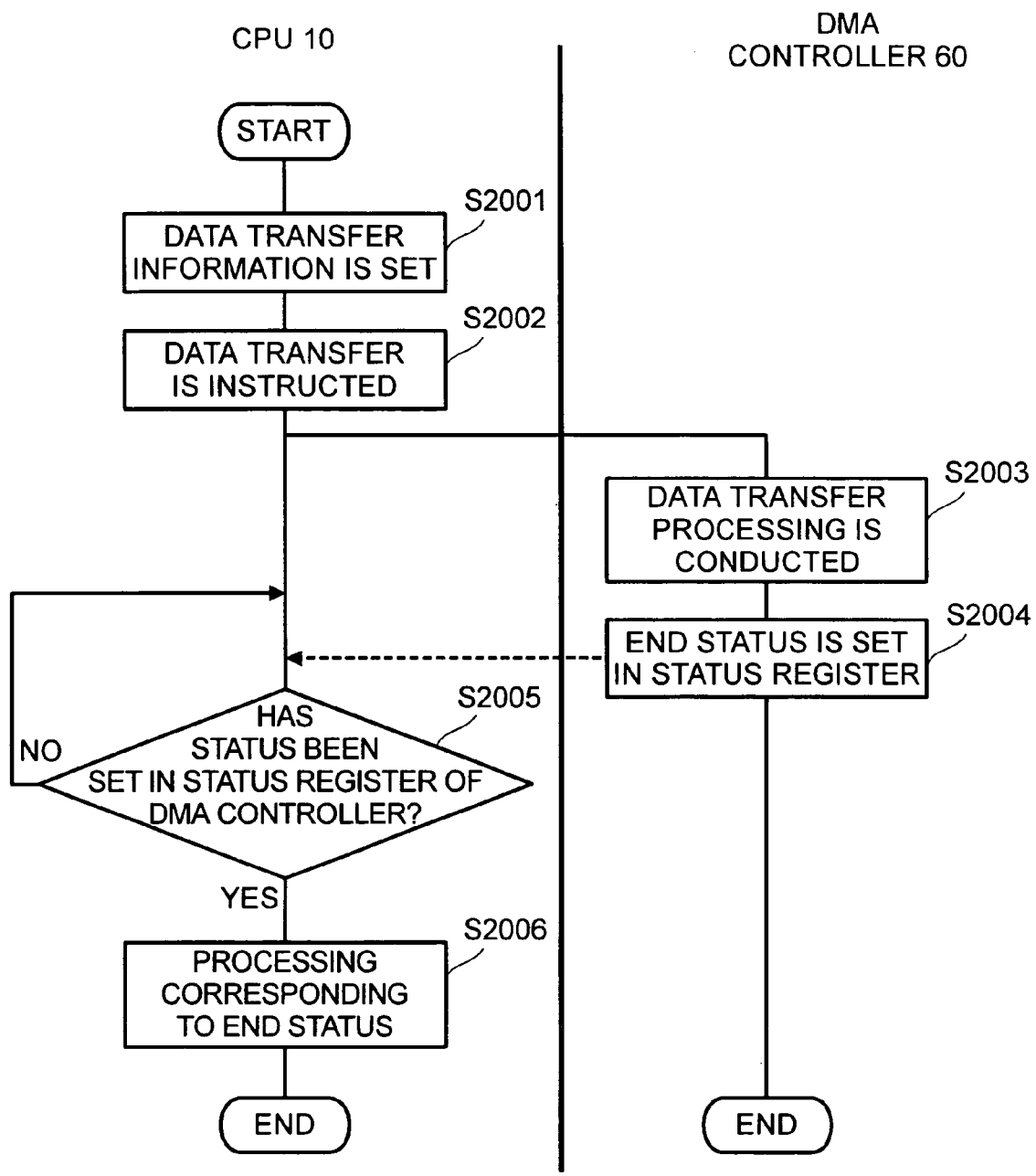

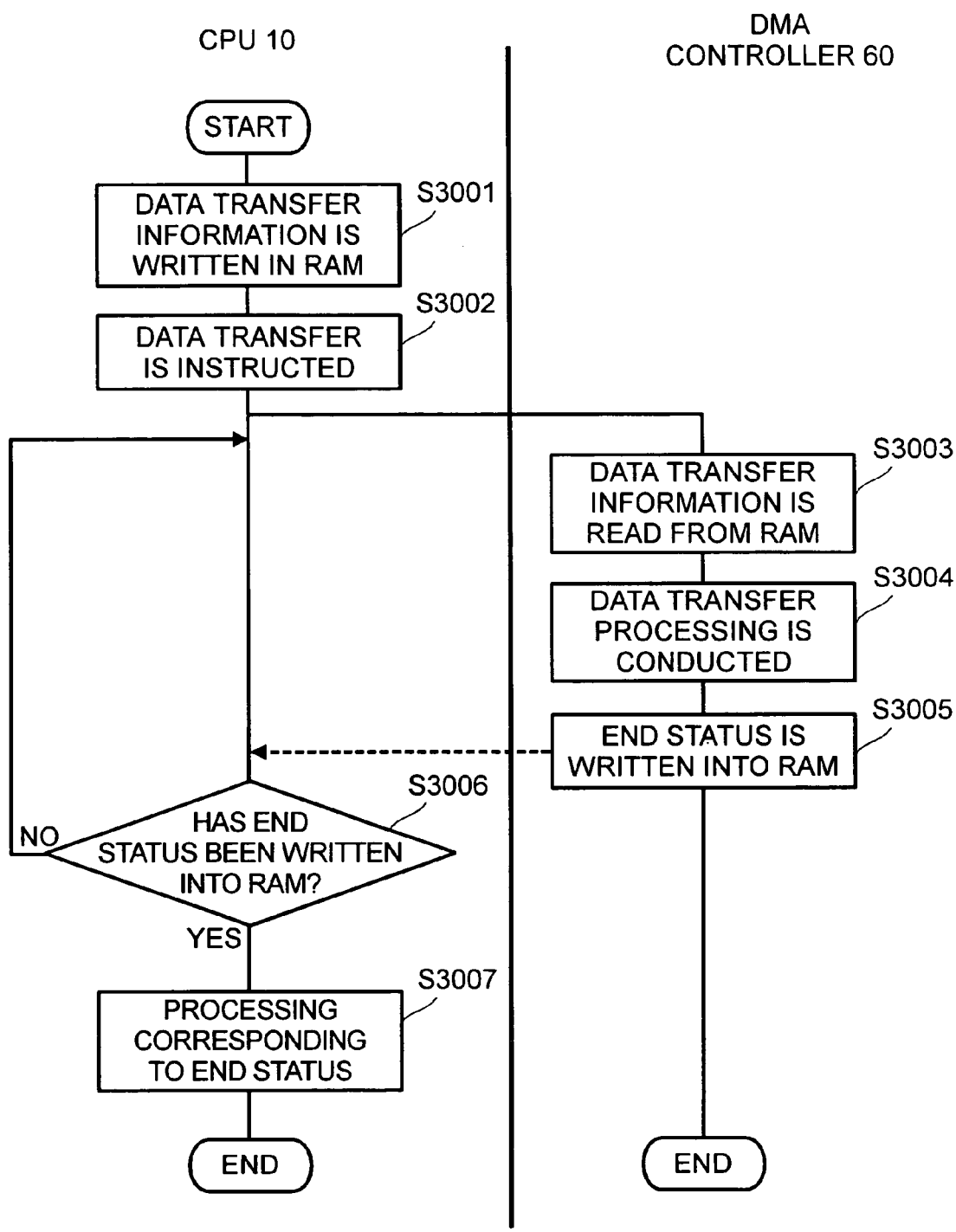

METHOD FOR CONTROLLING DATA TRANSFER UNIT HAVING CHANNEL CONTROL UNIT, STORAGE DEVICE CONTROL UNIT, AND DMA PROCESSOR

CROSS-REFERENCES TO RELATED APPLICATIONS

This application relates to and claims priority from Japanese Patent Application No. 2003-311639, filed on Sep. 3, 2003, the entire disclosure of which is incorporated herein by reference.

BACKGROUND OF THE INVENTION

The present invention relates to a method for controlling a data transfer unit and also to a data transfer unit, a channel control unit, and a storage device control unit.

DMA (Direct Memory Access) transfer technology using a DMA controller has been widely used as a method for transferring data directly between a memory and a device, and not via a CPU. In the DMA transfer, the CPU instructs to conduct data transfer processing by setting the information necessary for data transfer, such as data transfer source and destination, into the DMA controller. If the instruction to conduct data transfer processing is provided, the DMA controller conducts transfer processing of data, without the CPU.

However, with the conventional DMA transfer processing, because the CPU sets the information, such as data transfer source, directly into the DMA controller register, the time required for setting the data by the CPU into the DMA controller cannot be ignored, especially when data transfer processing is conducted frequently. Furthermore, if the DMA controller completes the data transfer processing, it notifies the CPU to this effect, for example, by interruption. However, as the number of data transfer processing operations increases, the number of notifications sent from the DMA controller to CPU also increases and the CPU processing is interrupted for each notification.

BRIEF SUMMARY OF THE INVENTION

Embodiments of the present invention provide a method for controlling a data transfer unit and also a data transfer unit, a channel control unit, and a storage device control unit that can use the CPU efficiently.

According to one aspect of the present invention, there is provided a method for controlling a data transfer unit having a structure in which a first processor, a second processor for transferring data stored in a first storage area into a second storage area, and a memory are connected by a bus, wherein the first processor writes data transfer information comprising information indicating a storage position in the first storage area and information indicating a storage position in the second storage area into the memory, the second processor reads the data transfer information from the memory, and the second processor transfers the data stored in the first storage area into the second storage area based on the data transfer information.

The aforesaid first processor is, for example, a microprocessor described hereinbelow. The aforesaid second processor is, for example, a data transfer LSI described hereinbelow. The aforesaid first storage area is, for example, a storage area provided in a cache memory described hereinbelow. The aforesaid second storage area is, for example, a storage area provided in a buffer memory described hereinbelow.

In accordance with an aspect of the present invention, a data transfer control system comprises a channel control unit configured to be connected to an external device; a cache memory connected to the channel control unit; and a storage device control unit connected to the cache memory. The storage device control unit is configured to be connected to at least one storage device. The channel control unit includes a communication interface configured to be connected to the external device; a buffer memory; a local memory; and a processor connected to the local memory and configured to write data transfer information into the local memory based on a data transfer request from the external device. The data transfer information includes information indicating a storage position in the buffer memory and information indicating a storage position in the cache memory. A data transfer control processor is connected with the processor via a bus and is connected to the buffer memory. The data transfer control processor is configured to read the data transfer information from the local memory, and to transfer data stored in one of the buffer memory and the cache memory into the other one of the buffer memory and the cache memory, according to the data transfer information.

In accordance with another aspect of the invention, a method for controlling data transfer comprises receiving a data transfer request from an external device; and writing data transfer information based on the data transfer request into a local memory by a processor. The data transfer information includes information indicating a storage position in a buffer memory and information indicating a storage position in a cache memory. The method further comprises reading the data transfer information from the local memory by a data transfer control processor which is connected with the processor via a bus; and transferring the data stored in one of the buffer memory and the cache memory into the other one of the buffer memory and the cache memory, according to the data transfer information, by the data transfer control processor.

BRIEF DESCRIPTION OF THE DRAWINGS

FIG. 2 is a flow chart illustrating the flow of typical data transfer processing according to one embodiment of the present invention.

FIG. 3 is a flow chart illustrating the flow of data transfer processing according to one embodiment of the present invention.

DETAILED DESCRIPTION OF THE INVENTION

First Embodiment

Figure 1:
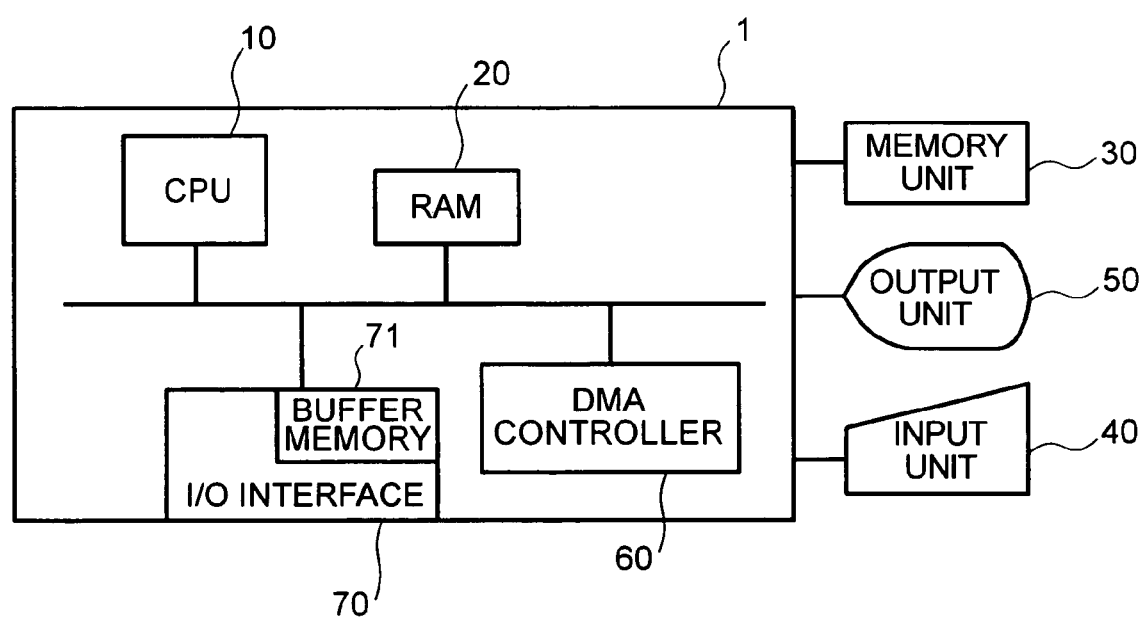
FIG. 1 is a block diagram illustrating a computer according to one embodiment of the present invention.

FIG. 1 is a block diagram illustrating a computer of an embodiment of the present invention. The computer 1 comprises a CPU 10, a RAM 20, a memory unit 30, an input unit 40, an output unit 50, a DMA controller 60, and an I/O interface 70.

The CPU 10 is a processor for controlling the entire computer 1. The CPU 10 reads a program recorded in the memory unit 30 to the appropriate RAM 20, and implements various functions by executing the program stored in the RAM 20. For example, a variety of devices such as a hard disk, a flexible disk, a semiconductor memory device, or the like, can be used for the memory unit 30. The memory unit 30 may be connected as an external device to the computer 1, as shown in the figure, or it may be integrally incorporated into the computer 1. The input unit 40 is a unit used by a user for inputting data into the computer 1. For example, it includes a keyboard, a mouse, or the like. The output unit 50 is a unit for outputting the information. For example, it includes a display, a printer, or the like.

The I/O interface 70 is an interface for conducting communication between the computer 1 and external devices. The I/O interface 70 is, for example, a communication interface for connecting to a LAN (Local Area Network) or an RS232C interface for serial connection. The I/O interface 70 comprises a buffer memory 71 and can write the received data into the buffer memory 71 or transmit the data stored in the buffer memory 71 to external devices according to control by the CPU 10.

The DMA controller 60 carries out data transfer between the devices and memories and between the memories and memories. The DMA controller 60 can continue data transfer processing, without employing the CPU 10, if the data transfer processing is started according to the instruction from the CPU 10. The DMA controller 60 can transfer data, for example, between the buffer memory 71 provided in the I/O interface 70 and the RAM 20.

Typical Data Transfer Processing

FIG. 2 is a flow chart illustrating the flow of typical data transfer processing. This figure shows the flow of data transfer processing between the buffer memory 71 and the RAM 20.

The CPU 10 sets the data transfer information, that is, the address of the buffer memory 71 and the address of the RAM 20 each of which serves as a transfer source or transfer destination of data transfer processing, the length of the data that will be transferred, and a data transfer direction (a value indicating whether the transfer is conducted from the buffer memory 71 to the RAM 20, or from the RAM 20 to the buffer memory 71), into a register of the DMA controller 60 (S2001). If the entire data transfer information is set into the DMA controller 60, the CPU 10 conducts writing into the register (start register) for starting the data transfer processing of the DMA controller 60 and instructs that the data transfer processing be started (S2002).

If writing is conducted into the start register, the DMA controller 60 conducts data transfer processing based on the data transfer information that was set in the register (S2003). Once the data transfer processing has been completed, the DMA controller 60 sets the end status into the prescribed register (status register) (S2004).

Meanwhile, the CPU 10 monitors the status register (S2005). If the CPU 10 detects that the end status has been written into the status register of the DMA controller 60 (S2005: YES), the CPU conducts processing corresponding to this end status (S2006).

Data Transfer Processing of the Present Embodiment

FIG. 3 is a flow chart illustrating the flow of data transfer processing according to the present embodiment. The CPU 10 writes the data transfer information into the RAM 20 (S3001), conducts writing into the start register of the DMA controller 60, and instructs that the data transfer processing be started (S3002).

If writing is conducted into the start register, the DMA controller 60 reads the data transfer information written into the RAM 20 (S3003) and conducts data transfer processing based on the data transfer information that was read out (S3004). Once the data transfer processing has been completed, the DMA controller 60 writes the end status into the RAM 20 (S3005).

Meanwhile, the CPU 10 monitors the RAM 20 (S3006) and if it detects that the end status was written into the RAM 20 (S3006: YES), the CPU conducts processing corresponding to this end status (S3007).

Further, in the above-described data transfer processing, data transfer processing by the DMA controller 60 was started by the CPU 10 conducting writing into the start register of the DMA controller 60. However, data transfer processing may be also started when the DMA controller 60 monitoring the RAM 20 detects that data transfer information was written.

Comparison of Processing Time

Figure 4B:
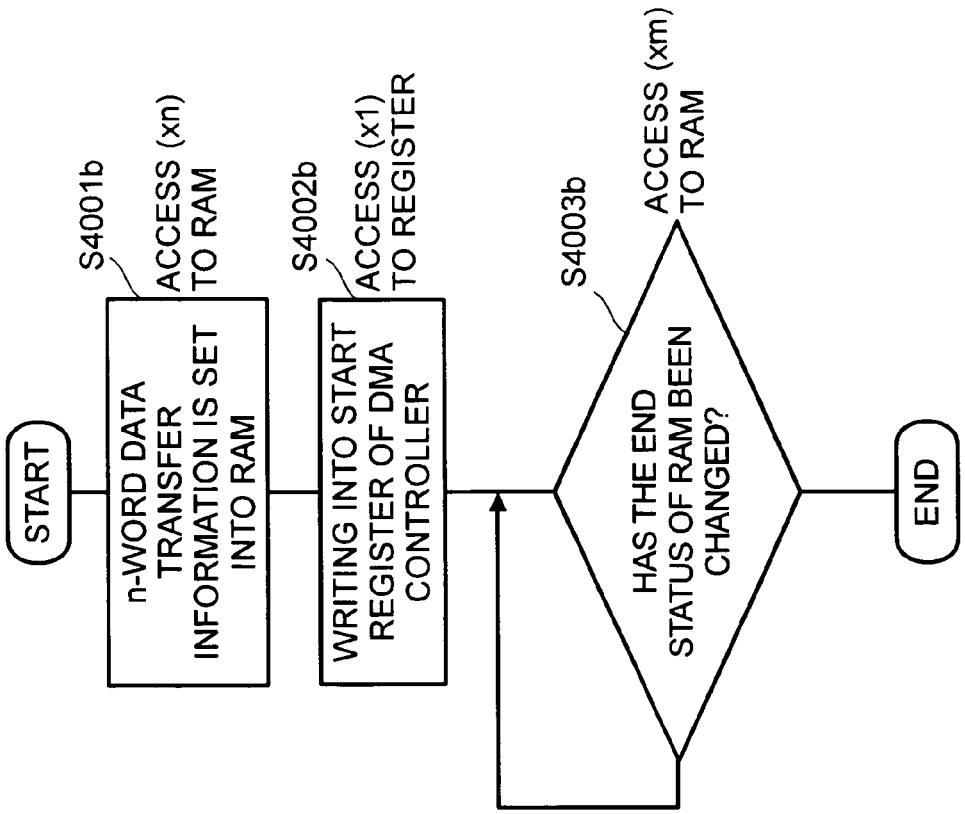
FIG. 4 is an explanatory drawing comparing the time required for typical data transfer processing and the time required for data transfer processing of the present embodiment in processing with CPU 10.
Figure 4A:
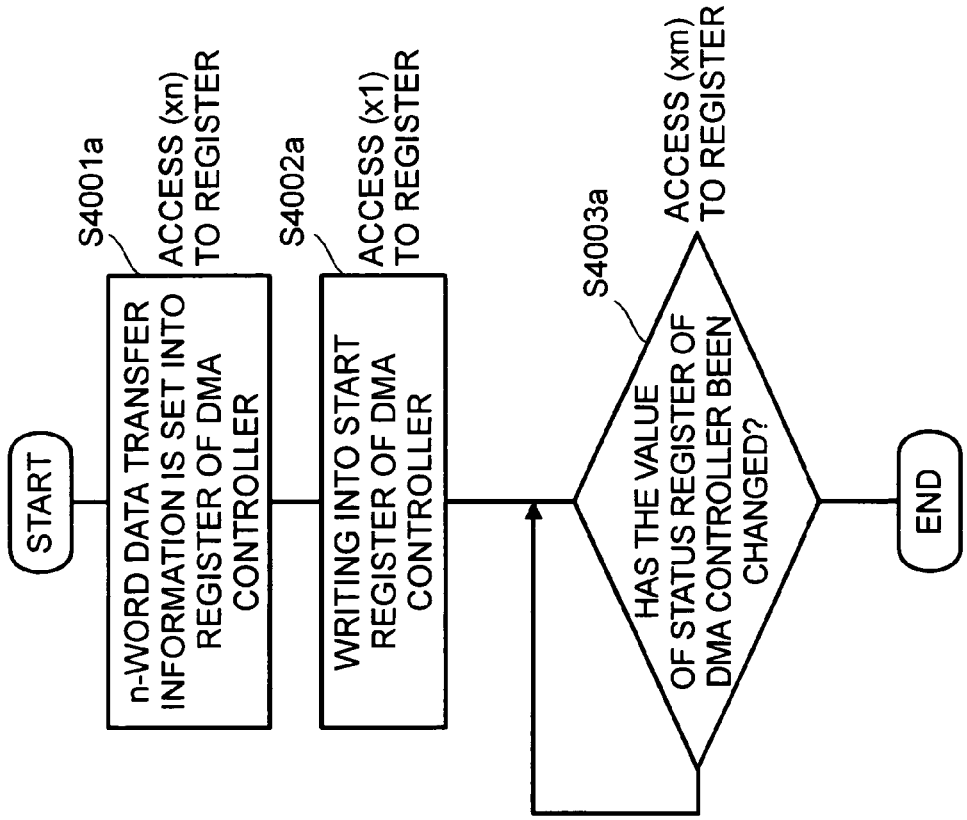

The processing time of CPU 10 will be explained below by comparing the above-described typical data transfer processing and data transfer processing in accordance with the present embodiment. FIG. 4 is an explanatory drawing for comparing the time required for typical data transfer processing and for data transfer processing in accordance with the present invention in processing with the CPU 10. FIG. 4(a) is an explanatory drawing illustrating the flow from the instant the CPU 10 instructs the DMA controller 60 to conduct data transfer processing to the instant the end status is acquired in the typical data transfer processing. FIG. 4(b) is an explanatory drawing illustrating the flow from the instant the CPU 10 instructs the DMA controller 60 to conduct data transfer processing to the instant the end status is acquired in the data transfer method of the present embodiment. Here, an assumption is made that the CPU 10 can write/read 1 word (4 bytes) at a time into/from the register of the DMA controller 60. The value which is set by the CPU 10 into the start register of the DMA controller 60 is also considered to be 1 word.

In the typical data transfer processing illustrated by FIG. 4(a), first, the CPU 10 sets the n-word information necessary for data transfer into the register of the DMA controller 60 (S4001a). In order to cause the DMA controller 60 to execute the data transfer processing, the CPU 10 conducts writing into the start register of the DMA controller 60 (S4002a) and monitors the status register of the DMA controller 60. In order to monitor the status register, the CPU 10 conducts m-cycle access to the status register (S4003a). Thus, in the typical data transfer processing, the CPU 10 conducts (n+1+m)-word access to the register of the DMA controller 60.

By contrast, in the data transfer processing of the present embodiment, illustrated by FIG. 4(b), first, the CPU 10 sets the information necessary for n-word data transfer to the RAM 20 (S4001b). In order to cause the DMA controller 60 to execute the data transfer, the CPU 10 conducts writing into the start register of the DMA controller 60 (S4002b) and monitors the RAM 20. In order to monitor the RAM 20 and to detect as to whether the end status has been written into the RAM 20, the CPU 10 conducts m-cycle access to the RAM 20 (S4003b). Thus, in the data transfer processing of the present embodiment, the CPU 10 conducts a 1-word access to the register of the DMA controller 60 and a (n+m)-word access to the RAM 20.

Because the clock of CPU 10 operation is faster than the clock used in the DMA controller 60, the access time of the RAM 20 from the CPU 10 is in most cases shorter than the access time of the register of the DMA controller 60. Therefore, in accordance with the present embodiment, the time required to set the information necessary for the CPU 10 to transfer data to the DMA controller 60 is shortened and the CPU 10 can operate more efficiently.

Furthermore, the DMA controller 60 makes it possible to read data with a high bus utilization efficiency by reading the data transfer information from the RAM 20 by a burst transfer. For example, let us assume that the DMA controller 60 and RAM 20 are connected with a PCI bus, the data length transferable by the PCI bus is 32 bit, and the data transfer information is 64 bytes. In this case the DMA controller 60 reads data from the RAM 20 in 32-bit units. Therefore, transfer processing for every 4 bytes is required for the DMA controller 60 to read the data transfer information from the RAM 20. In accordance with the present embodiment, the DMA controller 60 conducts this data transfer as a burst transfer, thereby making it possible to eliminate overhead accompanying data transfer present among a plurality of data transfers and to implement efficient transfer processing.

With the typical method, when the CPU 10 causes the DMA controller 60 to execute data transfer processing continuously, once the CPU 10 has detected that the data transfer processing by the DMA controller 60 has been completed, the CPU has to set the information necessary for subsequent data transfer into the DMA controller 60. By contrast, in accordance with the present embodiment, the CPU 10 can write the information necessary for data transfer processing into the RAM 20 regardless of the operation state of the DMA controller 60. Therefore, the CPU 10 can also instruct the DMA controller 60 to conduct a plurality of data transfer processing operations.

Second Embodiment

Figure 5:
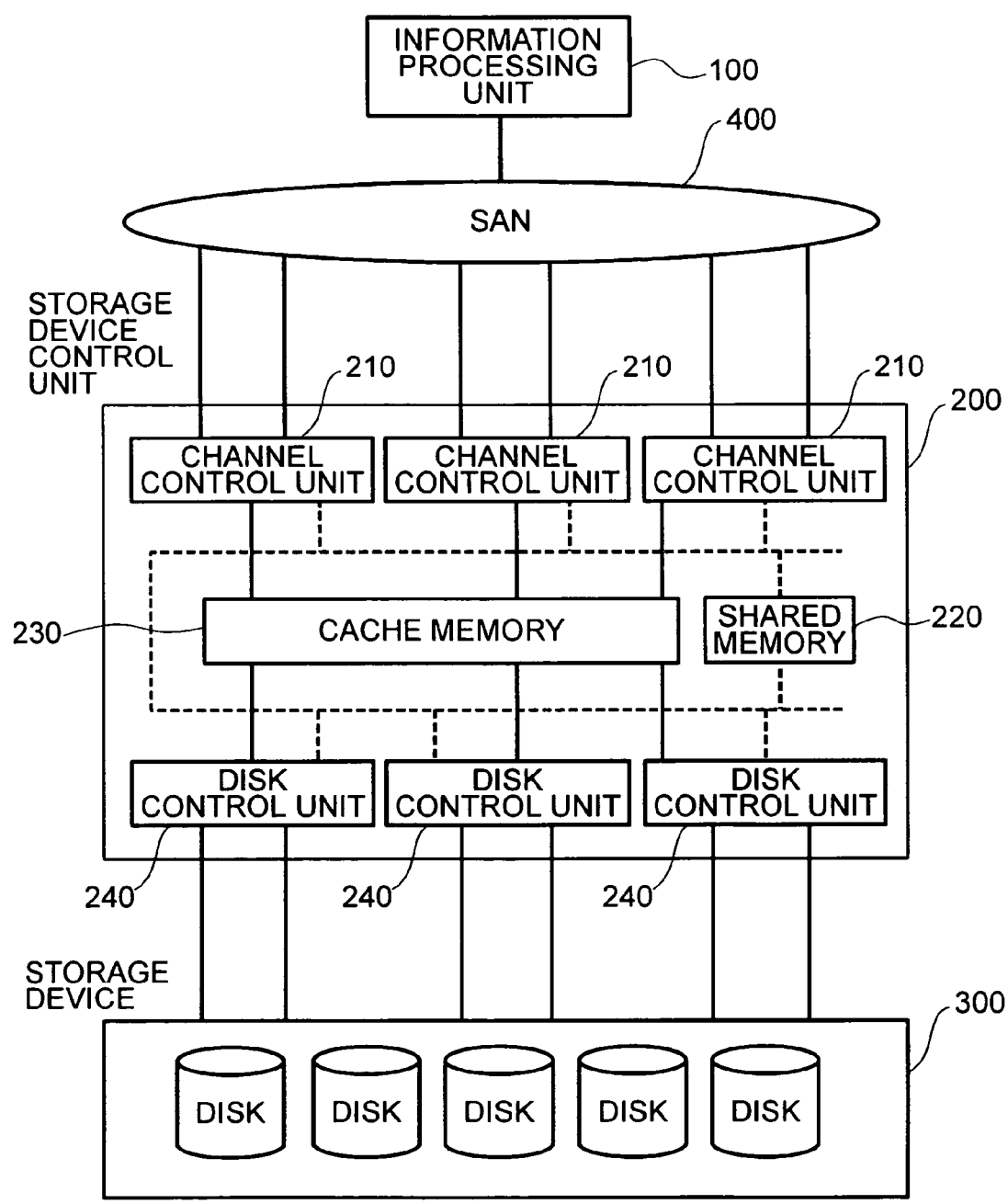
FIG. 5 is a block diagram illustrating the overall structure of the information processing system according to one embodiment of the present invention.

An embodiment in which the present invention is employed in a storage device control unit will be described below. FIG. 5 is a block diagram illustrating the overall configuration of the information processing system explained as the second embodiment of the present invention.

An information processing unit 100 and a storage device control unit 200 are connected to a network 400 and can communicate with each other via the network 400. The network 400 is, for example, a SAN (Storage Area Network). The network 400 may be other than the SAN. For example, connection may be made with a LAN (Local Area Network). A variety of protocols such as a fiber channel, ESCON (registered trade mark), FICON (registered trade mark), SCSI (Small Computer Surface Interface) can be used for the network 400.

The information processing unit 100 is a computer conducting information processing service by using a storage source provided by the storage device control unit 200. The aforesaid information processing service conducted by the information processing unit 100 is, for example, an automatic deposit and withdrawal system for banks or an airplane seat reservation system. The information processing unit 100 is a computer comprising a CPU (Central Processing Unit) and a memory, wherein a variety of functions are implemented by executing various programs with the CPU. The information processing unit 100 can be, for example, a mainframe computer, a workstation, a personal computer, and the like.

The storage device 300 comprises a plurality of disk drives and provides storage areas to the information processing unit 100. A variety of devices such as a hard disk device, a flexible disk device, or a semiconductor storage device can be used as the disk driver. The storage device 300 can also have a disk array, for example, composed of a plurality of disk drives. In this case, the storage areas which are to be provided to the information processing unit 100 can be provided by the plurality of disk drives managed by a RAID.

The storage device control unit 200 receives a data I/O request with respect to the storage device 300 from the information processing unit 100 and conducts processing relating to data I/O with respect to the storage device 300. The storage device control unit 200 includes channel control units 210, a shared memory 220, a cache memory 230, and disk control units 240. The channel control unit 210 comprises a communication interface for conducting communication with the information processing unit 100 and has a function of receiving the data I/O request relating to the storage device 300 from the information processing unit 100. The channel control unit 210 transmits a command requesting the disk control unit 240 to conduct data I/O with respect to the storage device 300 to the disk control unit 240. Having received the command, the disk control unit 240 conducts processing relating to data I/O with respect to the storage device 300. The shared memory 220 is a memory shared by the channel control units 210 and disk control units 240. For example, this memory stores commands relating to the above-mentioned control of data I/O. The cache memory 230 stores data exchanged between the channel control units 210 and disk control units 240.

If the information processing unit 100 sends a data I/O request (referred to hereinbelow as a data write request) requesting that data be written into the storage device control unit 200, then the channel control unit 210 receives the data I/O request. The channel control unit 210 generates a command (referred to hereinbelow as a data write command) instructing that data be written, according to the received data I/O request, and writes the command into the shared memory 220 and also writes the write data received from the information processing unit 100 into the cache memory 230. The disk control unit 240 conducts processing for reading the data write command from the shared memory 120 and writing the data written into the cache memory 230 into the storage device 300 based upon the data write command. Further, the data write command which is to be written into the shared memory 220 by the channel control units 210 and the data which is to be written into the cache memory 230 by the channel control units 210 can be also directly transmitted by the channel control units 210 into the disk control units 240.

Channel Control Unit

Figure 6:
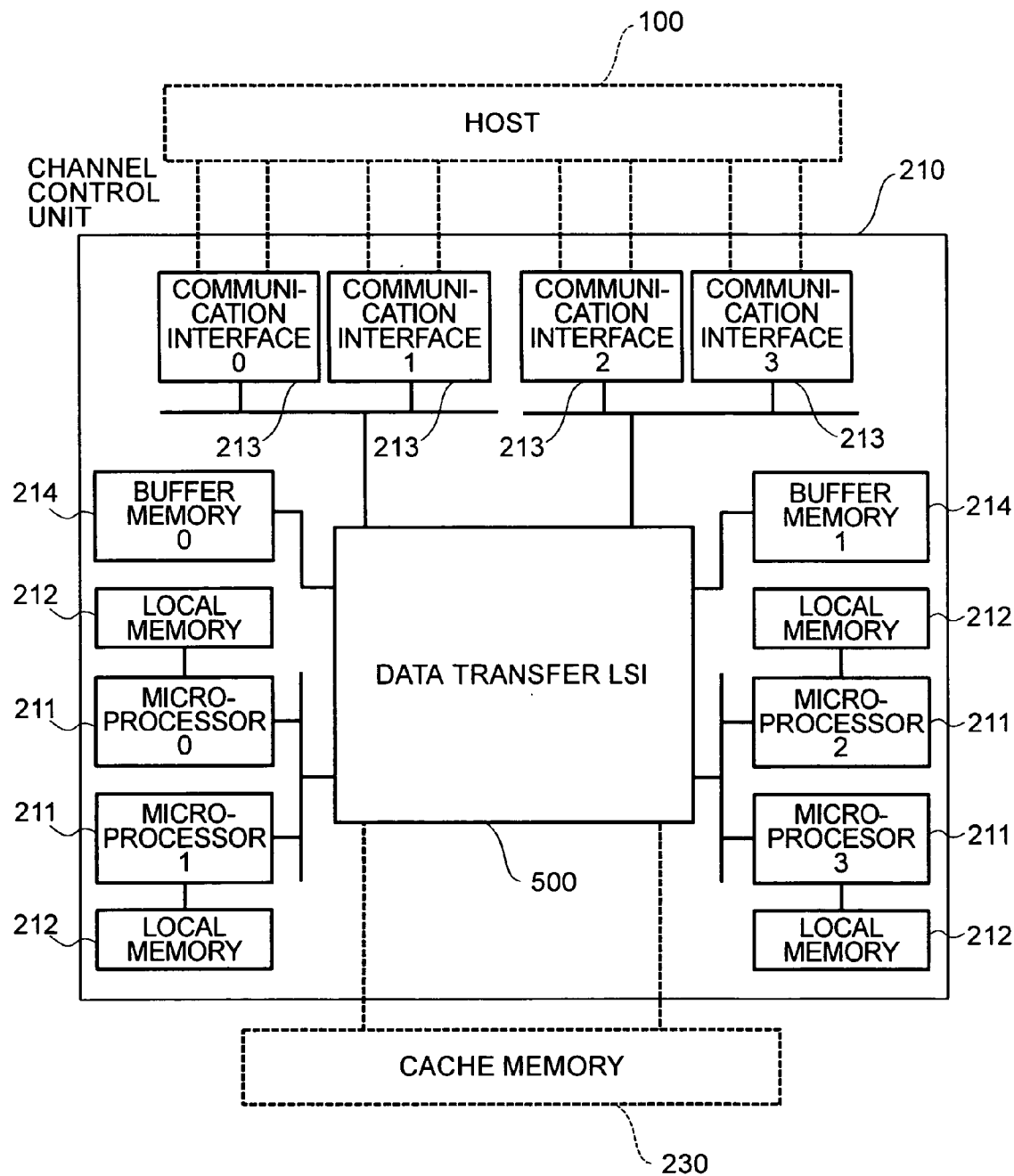
FIG. 6 is a block diagram illustrating the hardware configuration of the channel control unit 210 according to one embodiment of the present invention.

FIG. 6 is a block diagram illustrating the hardware configuration of the channel control unit 210. As shown in the figure, the channel control unit 210 comprises microprocessors 211, local memories 212, communication interfaces 213, buffer memories 214, and a data transfer LSI (large scale integration) 500 and is configured by forming all those components in the same unit. The channel control unit 210 can be integrally incorporated in the storage device control unit 200 or can be provided as an independent channel control unit that can be attached to the storage device control unit 200 and detached therefrom.

The channel control unit 210 comprises four microprocessors 211, four local memories 212, four communication interfaces 213, two buffer memories 214, and one data transfer LSI 500. However, no specific limitation is placed on the numbers of those components. For example, a configuration can be also used which comprises one microprocessor 211 and two data transfer LSI 500. When the channel control unit 210 comprises a plurality of data transfer LSI 500 units, the microprocessor 211 has to post the data transfer information to each of a plurality of data transfer LSI 500 units, but in accordance with the present embodiment, the microprocessor 211 can make a transition to a processing which has to be further conducted, without waiting the notice from the data transfer LSI 500. As a result, the microprocessor 211 can post the data transfer information indirectly via a memory to each of the data transfer LSI 500 units. Therefore, the increase in the processing efficiency of data transfer processing can be anticipated.

The microprocessors 211 are the processors for conducting control of all the channel control units 210 and they implement various functions by executing the programs stored in the local memories 212. The four microprocessors 211 shown in FIG. 6 independently conduct interpretation of the data I/O request received from the communication interface 213 and instructs the data transfer LSI 500 to conduct data transfer or the disk control unit 240 to read data from the storage device 300, according to the received data I/O request.

A variety of programs and data are stored in the local memories 212. In the channel control unit 210 of the present embodiment, each microprocessor 211 manages one local memory 212. The local memories 212 are connected via buses to the microprocessors 211. Furthermore, the local memories 212 are also indirectly connected to the data transfer LSI 500 via the buses located inside the microprocessors 211. The local memories 212 store the programs which are executed by the microprocessors 211 or the data used by the programs.

The communication interfaces 213 serve to conduct communication with the information processing unit 100 and comprise communication connectors for conducting communication with the information processing unit 100. In the case of the channel control unit 210, the data I/O request sent from the information processing device 100 is received, for example, according to a fiber channel, SCSI, FICON (registered trade name), ESCON (registered trade name), ACONARC (registered trade name), or FIBARC (registered trade name) protocol. The communication interfaces 213 store the received data in the buffer memories 214. Further, the communication interfaces 213 can also sent the data stored in the buffer memories 214 to the information processing unit 100.

The data transfer LSI 500 has a function of transferring data between two storage areas. The data transfer LSI 500 conducts data transfer between the devices and memories or between memories and memories, similarly to the DMA controller 60 provided in the computer 1 of the above-described first embodiment. In the present embodiment, the data transfer LSI 500 conducts data transfer mainly between the buffer memory 214 and the cache memory 230. Such a data transfer processing is conducted as part of data I/O processing implemented when the storage device control unit 200 receives a data I/O request from the information processing unit 100. If the communication interface 213 receives a data I/O request, the microprocessor 211 generates data transfer information according to the received data I/O request and writes the generated data transfer information into the local memories 212. The data transfer LSI 500 reads the data transfer information written into the local memories 212 and transfers the data based on the data transfer information that was read out. For example, when the channel control unit 210 receives a data write request from the information processing unit 100, the data transfer LSI 500 transfers the data that was received by the communication interfaces 213 and stored in the buffer memories 214 to the cache memory 230.

Data Transfer LSI

Figure 7:
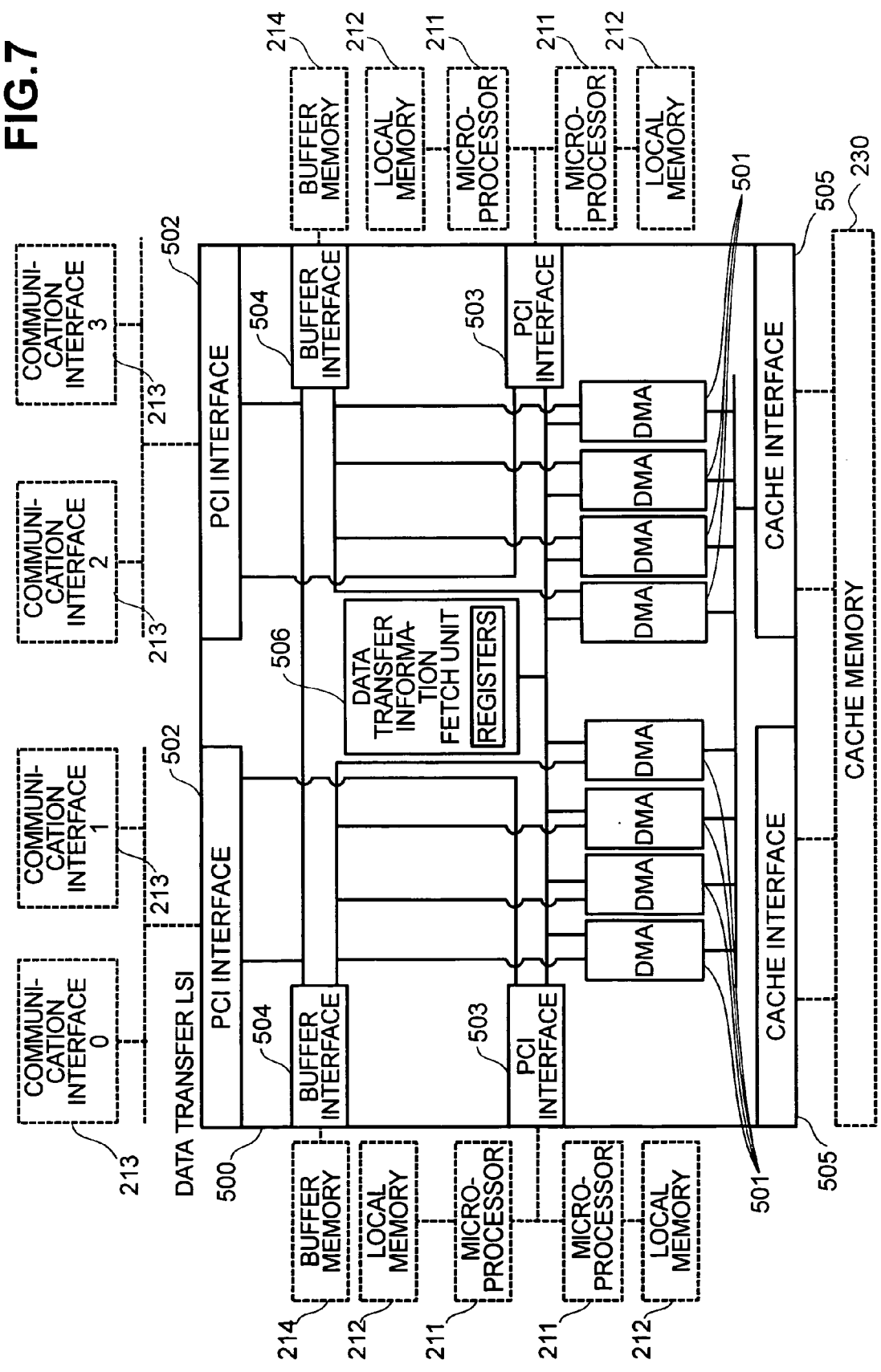
FIG. 7 is a block diagram illustrating the configuration of the data transfer LSI 500 according to one embodiment of the present invention.

FIG. 7 is a block diagram illustrating the configuration of the data transfer LSI 500. The data transfer LSI 500 comprises DMAs 501, PCI interfaces 502, PCI interfaces 503, buffer interfaces 504, cache interfaces 505, and a data transfer information fetch unit 506.

The PCI interfaces 502 are connected to a PCI bus for exchanging data with the PCI bus. The data transfer LSI 500 is connected to the communication interfaces 213 via the PCI interfaces 502.

The PCI interfaces 503 are also connected to a PCI bus, similarly to the PCI interfaces 502. The data transfer LSI 500 is connected to the microprocessors 211 and local memories 212 via the PCI interfaces 503.

Furthermore, the connection with the communication interfaces 213, microprocessors 211, and local memories 212 may be conducted with the same PCI bus. In this case, at least one PCI interface may be present in the data transfer LSI 500. Furthermore, the PCI interfaces 502 and PCI interfaces 503 may be connected to external devices by using a bus other than the PCI bus.

The buffer memories 214 are the buffers for temporarily storing data when the channel control unit 210 exchanges the data with the information processing unit 100. The buffer control units 504 conduct control for exchanging data with the buffer memories 214.

The cache interfaces 505 exchange data with the cache memory 230. The cache interfaces 505 can be also provided with a buffer memory for a more efficient data transfer.

Each DMA 501 is, for example, a DMA (Direct Memory Access) processor. The DMA 501 can transfer the data that has been stored in the storage area of a data transfer source to the storage area of a data transfer destination by setting the information specifying a storage area serving as the source for transferring the data and a storage area serving as the destination for transferring the data. The DMA 501 may use a program executable on a processor other than the DMA processor, for example, a microprocessor, and may be implemented by incorporating a logic into an IC for special applications.

The data transfer information fetch unit 506 conducts processing such as reading the information necessary for data transfer from the local memories 212 and setting it into the registers of DMA 501. The data transfer information fetch unit 506 can be, for example, an IC for special applications or a microprocessor.

Further, the data transfer LSI 500 may have a configuration comprising no data transfer information fetch unit 506, wherein the DMA 501 accesses the local memories 212.

Data Transfer Information

Figure 8:
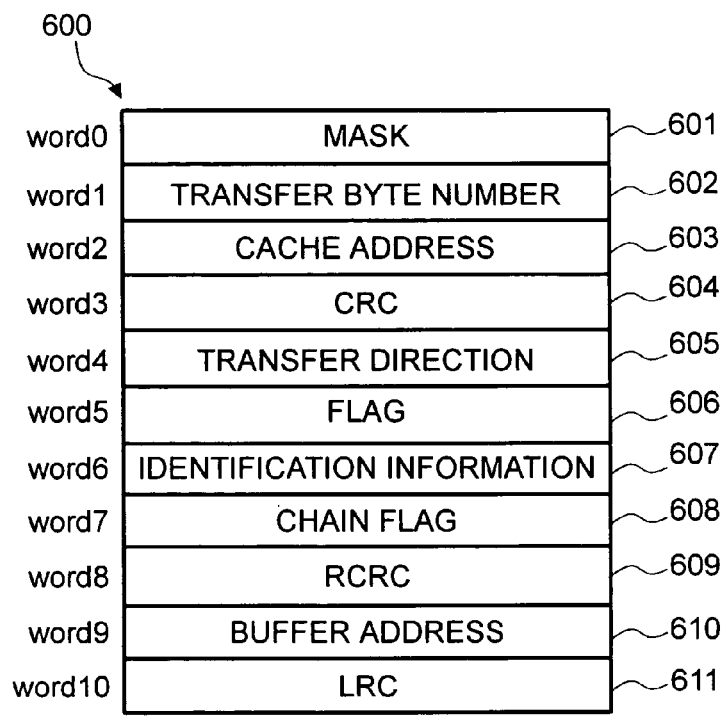
FIG. 8 is a table showing specifics of data transfer information which is the information necessary for data transfer by the data transfer LSI 500 according to one embodiment of the present invention.

FIG. 8 shows a table illustrating specifics of data transfer information which is the information necessary for the data transfer LSI 500 to transfer the data. The data transfer information 600 comprises a mask field 601, a transfer byte number field 602, a cache address field 603, a CRC field 604, a transfer direction field 605, a flag field 606, an identification information field 607, a chain flag field 608, an RCRC field 609, a buffer address field 610, and an LRC field 611. In the present embodiment, the data transfer information 600 has a data length of 10 words, with 4 bytes constituting 1 word. It is understood that any data length of data transfer information 600 can be selected. Furthermore, the data length of data transfer information 600 may be a variable length.

The microprocessors 211 continuously write a plurality of sets of data transfer information 600 from the prescribed addresses of local memories 212. As a result, the data transfer LSI 500 can continuously read each of a plurality of sets of data transfer information from the memories.

Furthermore, the microprocessors 211 manage the data transfer information 600 necessary for a serial data transfer processing by considering a group of sets of data transfer information 600 (referred to hereinbelow as a transfer information list) formed from the prescribed number of sets of data transfer information 600 as a unit. The above-mentioned serial data transfer processing is, for example, in relation to the data transfer performed in response to a data I/O request received by the channel control unit 210, a plurality of data transfer processing operations conducted by the data transfer LSI 500 in the case when the storage area on the cache memory 230 which is a data transfer source or destination is discontinuous.

Each field of the data transfer information 600 will be described hereinbelow.

When the values that were set in each field of data transfer information 600 that has just been processed by the data transfer LSI 500, among the sets of data transfer information 600 belonging to the transfer information list to which this data transfer information 600 is attached, are copied and used in each field of this data transfer information 600 with the object of inheriting the values, the information indicating the field from which the value is to be copied is set in the mask field 601.

The length of the data which is the transfer object is set in the transfer byte number field 602.

The address on the cache memory 230, which is used as the transfer source or transfer destination by the data transfer LSI 500 conducting data transfer, is set in the cache address field 603.

An error detection code relating to the data which is the transfer object is set in the CRC field 604. For example, the microprocessors 211 compute a CRC code by using a CRC (Cyclic Redundancy Check) with respect to the data which is the transfer object and set it into the CRC field 604. When the data transfer LSI 500 conducts data transfer, the absence of an error in the data which is the transfer object can be confirmed by using the value set in this field. For example, the data transfer LSI 500 can be prevented from conducting data transfer processing when the presence of an error in the data which is the transfer object has been established.

A value indicating whether the data transfer LSI 500 transfers the data stored in the cache memory 230 into the buffer memory 214 or transfers the data stored in the buffer memory 214 into the cache memory 230 is set in the transfer direction field 605.

Information indicating various set items is set in the flag field 606. Values indicating settings such as whether the microprocessor 211, for example, conducts error detection of data using the above-described value of CRC field, or whether it conducts synchronous or asynchronous writing of data into the disk control unit 240 can be set in the flag field 606.

Identification information assigned by the microprocessor 211 to each transfer information list is set in the identification information field 607.

A flag value indicating whether the next data transfer information 600 of a series of sets of data transfer information 600 belonging to the transfer information list is to be processed is set into the chain flag field 608. By using the values that will be set in the identification information field 607 or chain flag field 608, the data transfer LSI 500 can decide as to whether the data transfer information that was read from the memory belongs to the data transfer information group that will be related and processed. Furthermore, the data transfer LSI 500 can read other sets of data transfer information 600 belonging to the data transfer group to which this data transfer information 600 belongs and can conduct data transfer processing.

An error detection code relating to the data which is the transfer object is set in the RCRC field 609. The error detection code set in the RCRC field 609 is computed, for example, by a CRC method. The RCRC field 609 is an error detection code relating to the data which is the transfer object in the case, for example, when the present storage device control unit 200 implements the transfer of data relating to the copying (remote copying) of data corresponding to another storage unit, rather that data transfer between the information processing unit 100 and the storage device 300. The error detection code relating to the data which is the transfer object is set in the RCRC field 609 similarly to the above-described CRC field 604, but the error detection code which is to be set in the RCRC field 609 is copied into the below-described end status information and written into the local memories 212. As a result, the microprocessors 211 can acquire the error detection code relating to the data which is to be the transfer object after completing the data transfer processing. The microprocessors 211 can use, for example, the error detection code relating to the data which is the transfer object of the past data transfer processing that was acquired from the end status information, as the initial value for computing the error detection code relating to the data which is the transfer object of the data transfer processing. The microprocessors 211 can compute the error detection codes for all the data which are the transfer objects over a plurality of sets of data transfer information 600.

An address on a buffer memory 214 which is used as the transfer source or transfer destination for the data transfer LSI 500 conducting data transfer is set in the buffer address field 610.

An error detection code relating to this data transfer information 600 is set in the LRC field 611. This error detection code is, for example, a LRC code computed by the LRC method. The microprocessor 211 computes the LRC code by using values of each field, that is, the mask field 601, transfer byte number field 602, cache address field 603, CRC field 604, transfer direction field 605, flag field 606, identification information field 607, chain flag field 608, RCRC field 609, and buffer address field 610. In this process, the address serving as a reference for writing the data transfer information 600 into the local memory 212 is used as an initial value.

The data transfer LSI 500 can verify whether the data transfer information that was read out is correct information by the error detection code assigned to the data transfer information. Therefore, more reliable data transfer can be implemented.

Further, the microprocessor 211 generates the error detection code by including into the computation object not only the data transfer information, but also the reference position for determining the position from which the data transfer LSI 500 will read the data transfer information from the local memory 212. As a result, the data transfer LSI 500 can detect the presence of an error when the error is present in the contents of the data transfer information and when the storage position on the memory from which the data transfer LSI 500 has read out the data transfer information was erroneous.

In the present embodiment, the error detection code set in the CRC field 604, RCRC field 609, and LRC field 611 of data transfer information 600 is not limited to the CRC code and LRC code, and a variety of other codes such as a check sum or a Hamming code can be used. Moreover, the error detection code set in the CRC field 604, RCRC field 609, and LRC field 611 of data transfer information 600 may be also computed by the data transfer LSI 500.

Furthermore, in the present embodiment the identification information set in the identification information field 607 is set in the transfer information list unit, but the identification information may be also attached to the data transfer information 600 unit. The data transfer LSI 500 conducts data transfer processing based on the data transfer information 600, and the resulting below-described end status information is written into the local memory 212 correspondingly to the identification information attached to the transfer information list unit. As a result, the microprocessor 211 can acquire the results of data transfer processing with the unit to which the identification information is attached.

End Status Information

Figure 9:
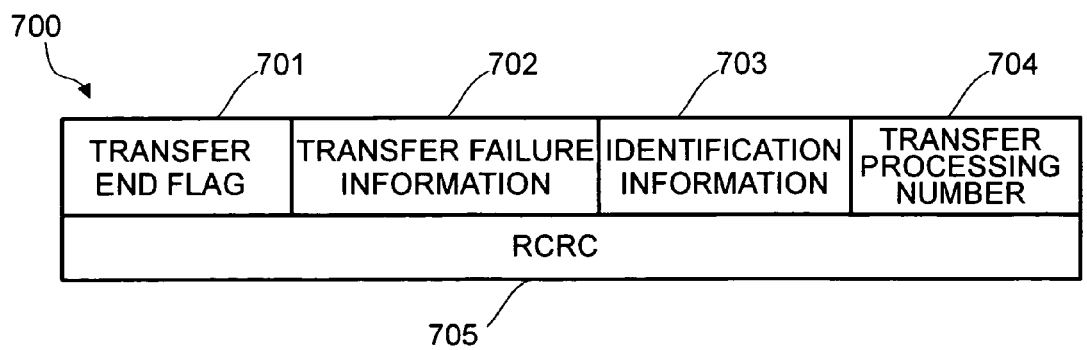
FIG. 9 is a table illustrating an example of end status information written by the data transfer LSI 500 into the local memory 212 when data transfer with the data transfer LSI 500 has been completed, this example relating to one embodiment of the present invention.

FIG. 9 represents a table illustrating an example of end status information which is written by the data transfer LSI 500 into the local memory 212 when data transfer by the data transfer LSI 500 is completed.

The end status information 700 comprises a transfer end flag field 701, a failure information field 702, an identifier field 703, a transfer processing number 704, and an RCRC field 705.

A value indicating whether the data transfer LSI 500 has completed transferring the data is set in the transfer end flag field 701.

When any failure has occurred during data transfer processing conducted by the data transfer LSI 500, information relating to this failure is set in the failure information field 702. The information relating to a failure is, for example, the prescribed error code.

The identification information that has been set in the identification information field 607 of data transfer information 600 read by the data transfer LSI 500 is set as-is in the identification information field 703. As a result, the data transfer LSI 500 associates the end status information 700 with the transfer information list.

In accordance with the present embodiment, the microprocessor 211 associates the data transfer information 600 and the end status information 700 by the identification information attached to the data transfer information 600. Therefore, for example, even when a plurality of sets of end status information 700 are co-present in the local memories 212, the microprocessor 211 can specify for which of the respective sets of data transfer information 600 each of the end statuses is the end status. Furthermore, the microprocessor 211 can decide as to whether the data transfer LSI 500 has correctly processed the data transfer information 600 and responds with the end status information 700 to the local memory 212. For example, when an address is already present on the local memory 212 where the end status information 700 is written by the data transfer LSI 500, the microprocessor 211 can confirm that the end status information 700 written in the local memory 212 by the data transfer LSI 500 corresponds to the data transfer information 600 specified by the microprocessor 211. As a result, the microprocessor 211 can check that data transfer LSI 500 has read the data transfer information 600 expected by the microprocessor 211 and that the data transfer LSI 500 has written the end status information 700 in the already existing address on the local memory 212.

The number of sets of data transfer information 600 that has been processed by the data transfer LSI 500, among the sets of data transfer information 600 belonging to the transfer information list, is set in the transfer processing number field 704. The microprocessor 211 uses the chain flag field 608 of data transfer information 600 and specifies the number of sets of data transfer information 600 which are to be processed, of the transfer information list, to the data transfer LSI 500. The data transfer LSI 500 sets the number that has actually been subjected to data transfer processing into the transfer processing field 704 of end status information 700. The microprocessor 211 can decide as to whether the data transfer LSI 500 operated correctly by comparing the indicated number of data transfer processing operations and the number of processing operations conducted by the data transfer LSI 500.

The value that has been set in the RCRC field 609 of data transfer information 600 is set as is in the RCRC field 705. The data transfer LSI 500 computes the error detection code relating to data which is to be the transfer object, based on the value set in the RCRC field 609 or data transfer information 600, and can also set the results obtained into the RCRC field 705.

In accordance with the present embodiment, data transfer information is indirectly posted from the microprocessor 211 to the data transfer LSI 500 via the local memory 212. Because the data transfer LSI 500 thus writes the end status information 700 into the memory, for example, the microprocessor 211 can examine whether the data transfer processing has been conducted by the data transfer LSI 500 by post factum examination of the end status.

If the data transfer LSI 500 completes the data transfer processing, the results are sequentially written as the end status information 700 from the prescribed address of the local memory 212. In the present modification, the prescribed address of the local memory 212 is assumed to be set in advance by the microprocessor 211 in the register of data transfer LSI 500 by initial setting or the like. Setting of each register of data transfer LSI 500 will be described below.

Register Configuration

Figure 10:
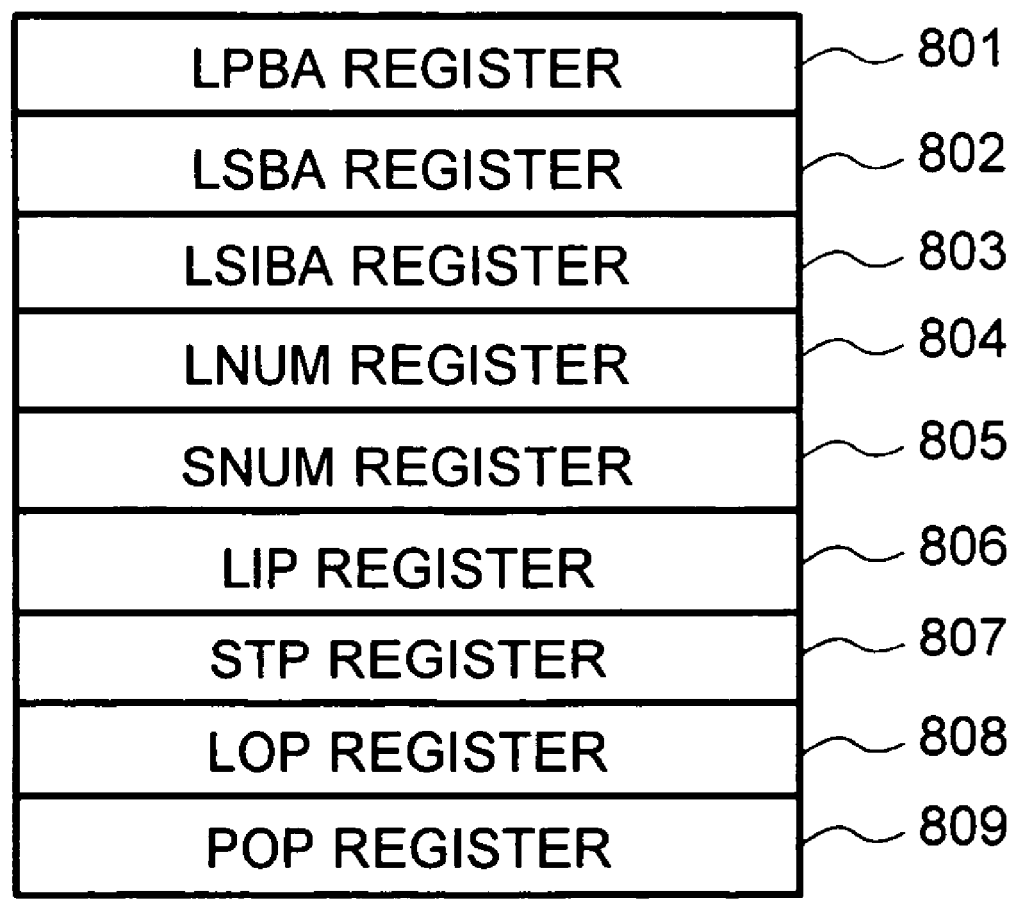
FIG. 10 is a table illustrating a register contained in the data transfer LSI 500 according to one embodiment of the present invention.

FIG. 10 represents a table showing the registers in the data transfer LSI 500. The data transfer LSI 500 comprises a LPBA register 801, a LSBA register 802, a LSIBA register 803, a LNUM register 804, a SNUM register 805, a LIP register 806, a STP register 807, a LOP register 808, and a POP register 809.

An address (referred to hereinbelow as a list base address) serving as a reference for the address where the microprocessor 211 will write the data transfer information 600 into the local memory 212 is set in the LPBA register 801. The microprocessor 211 sequentially writes the data transfer information 600 from the list base address set in the LPBA register 801.

An address (referred to hereinbelow as a status base address) serving as a reference for the address where the data transfer LSI 500 will write the end status information 700 into the local memory 212 is set in the LSBA register 802. The data transfer LSI 500 sequentially writes the end status information 700 from the status base address.

An address (referred to hereinbelow as a status pointer address) on the local memory 212 for writing a pointer (referred to hereinbelow as a status pointer) indicating the orderly number of the end status information 700 written by the data transfer LSI 500 from the status base address is set in the LSIBA register 803.

The number of sets of data transfer information 600 that can be set in one transfer information list is set in the LNUM register 804.

The number of times the data transfer LSI 500 can write the end status 700 on the local memory 212 is set in the SNUM register 805.

The information (referred to hereinbelow as a list write pointer) indicating the orderly number, from the list base address, of the transfer information list written by the microprocessor 211 into the local memory 212 is set into the LIP register 806 by the microprocessor 211. The LIP register 806 is updated each time the microprocessor 211 writes the data transfer information 600 belonging to the transfer information list into the local memory 212.

A status pointer is set in the STP register 807. The data transfer LSI 500 updates the STP register 807 each time the end status information 700 is written into the local memory 212. Furthermore, the data transfer LSI 500 writes the value hat was set in the STP register 807 into the status pointer address on the local memory 212.

A pointer (referred to hereinbelow as a list read pointer) indicating the orderly number, from the list base address, of the transfer information list comprising the data transfer information 600 that was read by the data transfer LSI 500 is set by the data transfer LSI 500 into the LOP register 808.

The number of sets of data transfer information 600 that were actually processed by the data transfer LSI 500, among those belonging to the transfer information list, is set in the POP register 809 with respect to the transfer information list comprising the data transfer information 600 that was read by the data transfer LSI 500 from the local memory 212. The microprocessor 212 can verify that the data transfer processing has been conducted correctly by comparing the number of data transfer processing operations specified by using the chain flag field 608 of the above-described data transfer information 600 and the number of data transfer processing operations actually conducted by the data transfer LSI 500.

The data transfer LSI 500 can detect that a new instruction relating to data transfer processing has been provided by the microprocessor 211, by comparing the list write pointer that was set in the LIP register 806 and the list read pointer that was set in the LOP register 808.

The data transfer LSI 500 can examine whether the data transfer information that has to be subsequently processed by the data transfer LSI 500 is present, by comparing the contents of the LIP register 806 and the LOP register 808.

Further, the registers comprised by the data transfer LSI 500 can be also implemented so as to be comprised by a data transfer information fetch circuit 506 or DMA 501. Moreover, the information stored in those registers may be also stored in the local memory 212 or shared memory 220, rather than in the registers.

Flow of Data Transfer Processing Using Transfer Information List

Figure 11:
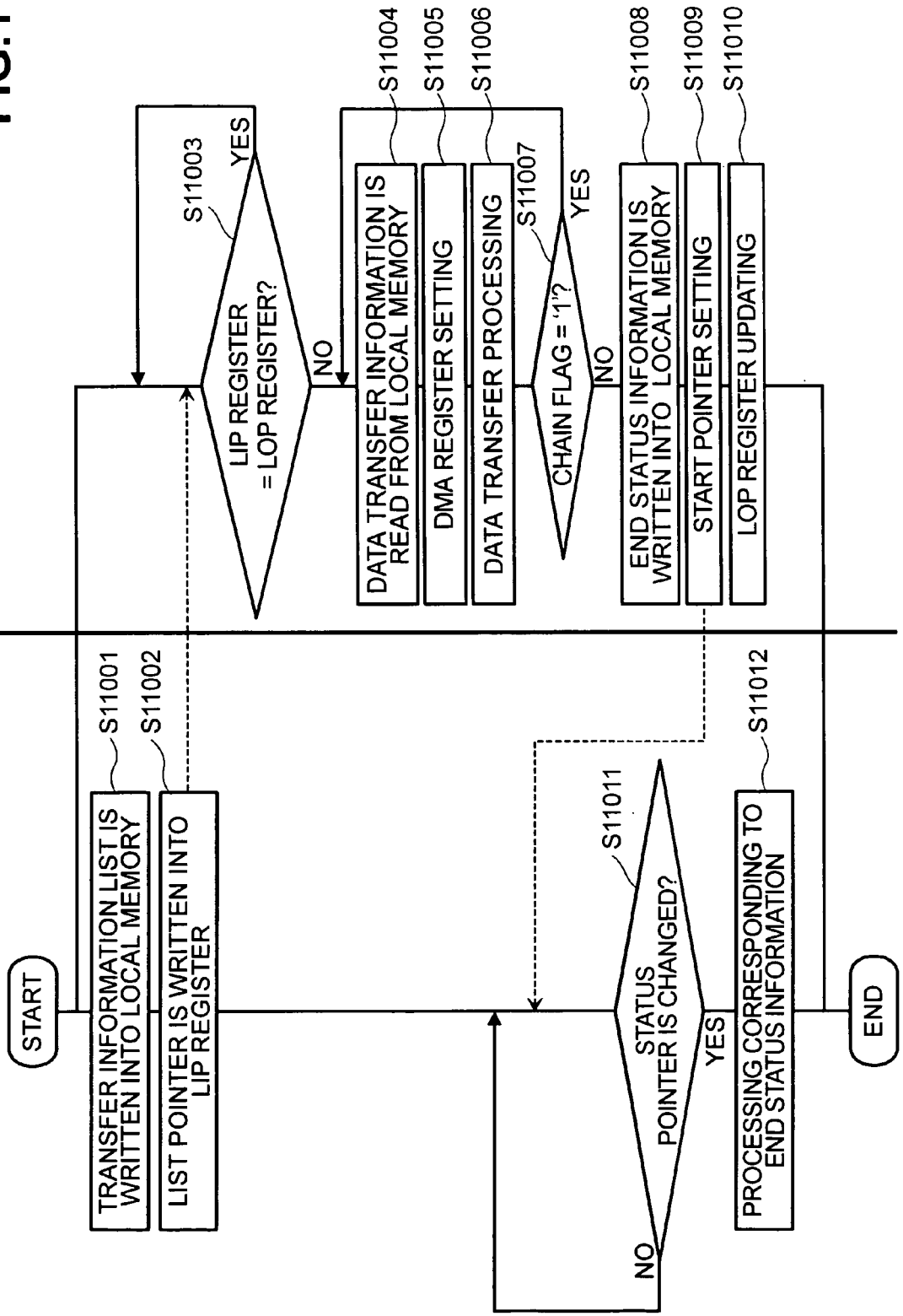
FIG. 11 is a flow chart illustrating the flow of processing conducted in data transfer processing using a transfer information list according to one embodiment of the present invention.

The data transfer processing using the transfer information list of the present embodiment will be described below. FIG. 11 is a flow chart illustrating the flow of processing which is conducted by the data transfer processing using the transfer information list.

The microprocessor 211 writes the prescribed number of sets of data transfer information 600 that were set into the LNUM register 804 of the data transfer LSI 500 as a transfer information list into the local memory 212 (S11001) and sets a list pointer into the LIP register 806 of the data transfer LSI 500 (S11002).

Meanwhile, the data transfer LSI 500 waits till a new list pointer is set into the LIP register 806, while comparing the LIP register 806 with the LOP register 808 (S11003). If the data transfer LSI 500 detects that a list pointer was set into the LIP register 806 by the microprocessor 212 (S11003: NO), it reads the data transfer information 600 present in the local memory 212 (S11004). Inside the data transfer LSI 500, the data transfer information fetch circuit 506 reads the data transfer information 600 from the local memory 212 and sets a value necessary for data transfer processing into the register of DMA 501 (S11005). The data transfer LSI 500 conducts processing relating to data transfer between the cache memory 230 and the buffer memory 214 based on the data transfer information 600 that was read out (S11006). If the data transfer processing is completed, the data transfer LSI 500 examines whether the value that was set in the chain flag field 608 of the data transfer information 600 is "1" (S11007). When the value that was set in the chain flag field 608 of the data transfer information 600 is "1" (S11007: YES), the processing flow proceeds to (S11004). As for the data transfer information 600 which is read in the next (S11004), the data transfer LSI 500 reads the data transfer information 600 stored in the address that was advanced by the data length of the data transfer information 600 from the address from which the data transfer LSI 500 has read the data transfer information 600 before. The data transfer LSI 500 thus reads sequentially the data transfer information 600, based on the chain flag 608 of the data transfer information 600 that was read out. Further, the data transfer LSI 500 may also read at once the entire data transfer information 600 belonging to the transfer information list to which this data transfer information 600 belongs.

When the chain flag field 608 of data transfer information 600 is not "1" (S11007: NO), the data transfer LSI 500 writes the results of data transfer as an end status information 700 into the local memory 212 (S11008) and increases the status pointer set in the STP register 807 by 1 (S11009). The data transfer LSI 500 writes the status pointer set into the STP register 807 into the status pointer address on the local memory 212, increases the list pointer set in the LOP register 808 by 1, and updates the LOP register 808 (S11010).

Meanwhile, if the status pointer is updated by the data transfer LSI 500, the microprocessor 211 detects this update (S110011: YES), reads the end status information 700 from the local memory 212 and conducts end processing corresponding to this end status information 700, for example, transmits error information to the information processing device 100 or carries out error display on the display unit (S11012).

Because the microprocessor 211 thus writes a plurality of sets of data transfer information 600 as a single transfer information list into the local memory 212, the data transfer LSI 500 can read each of the plurality of sets of data transfer information continuously from the memory. Furthermore, by using the identification information of the data transfer information 600, the data transfer LSI 500 can recognize whether the data transfer information 600 that was read from the memory belongs to the data transfer information group that will be related and processed. Further, by using the identification information field 607 or chain flag field 608 of the data transfer information 600 that was read from the local memory 212, the data transfer LSI 500 can read other data transfer information 600 belonging to the data transfer group to which this data transfer information belongs and can conduct data transfer processing.

Moreover, the data transfer LSI 500 may also periodically write the status pointer that will be set into the STP register 807 into the local memory 212. Moreover, the data transfer LSI 500 may directly store the status pointer in the local memory 212, without using the STP register.

Specific Processing Flow

Figure 12:
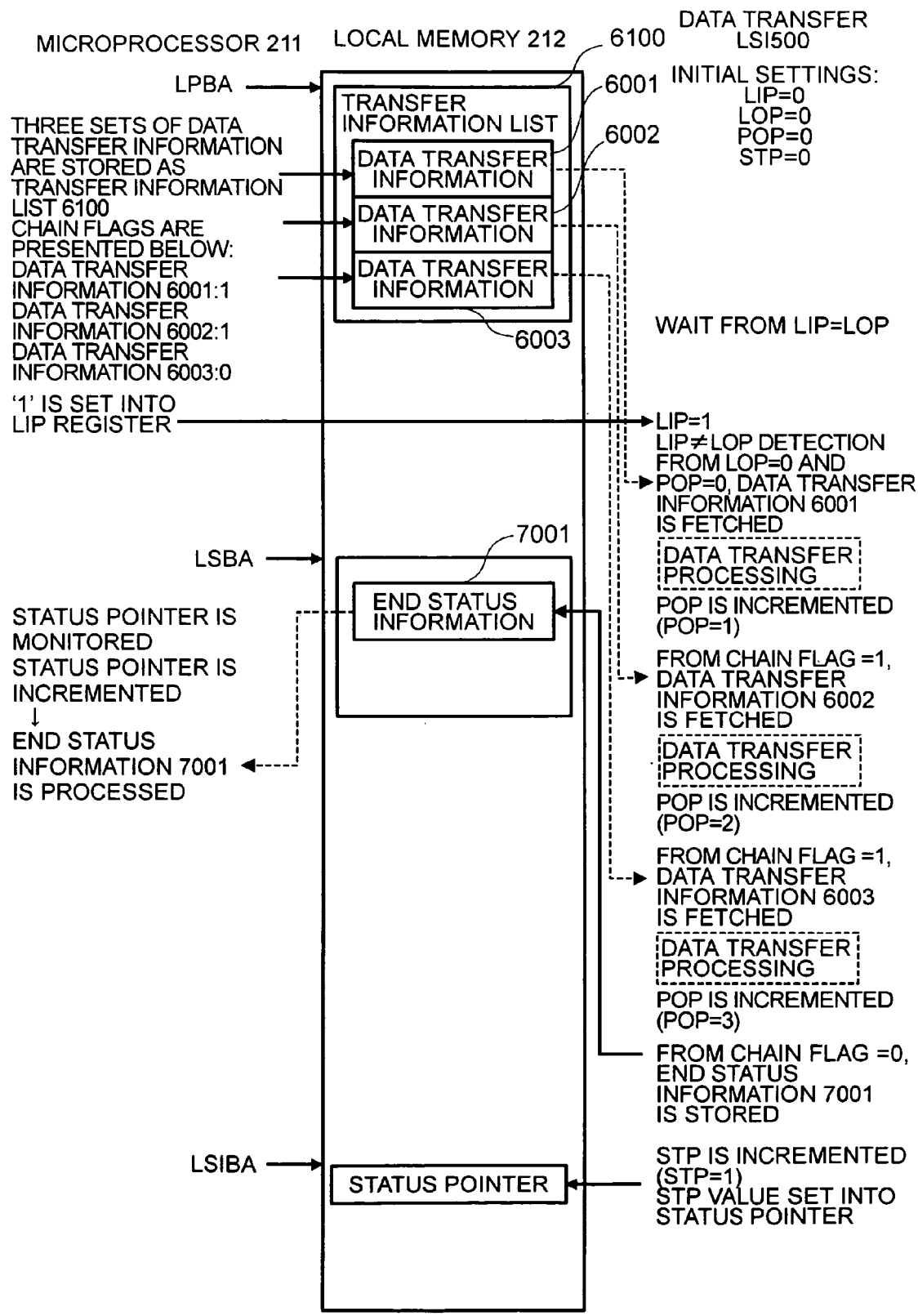
FIG. 12 is an explanatory drawing representing a specific example of data transfer processing according to one embodiment of the present invention.
Figure 13:
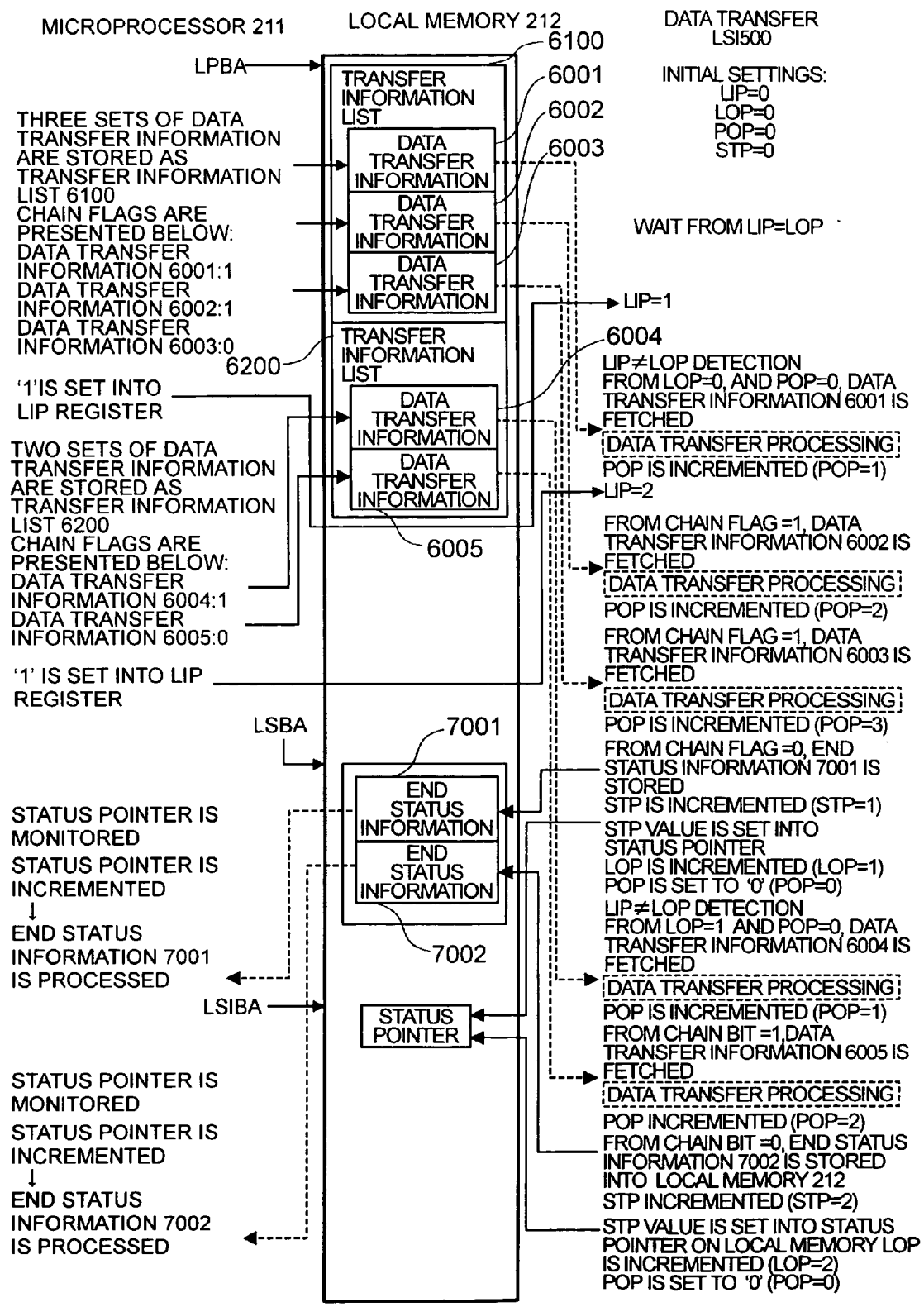
FIG. 13 is an explanatory drawing representing a specific example of data transfer processing according to one embodiment of the present invention.

FIG. 12 and FIG. 13 are explanatory drawings representing specific examples of data transfer processing according to the present embodiment. FIG. 12 illustrates processing relating to the case in which the microprocessor 211 wrote a transfer information list into one local memory 212, and FIG. 13 illustrates processing relating to the case in which the microprocessor 211 wrote two transfer information lists into the local memory 212.

As shown in FIG. 12 and FIG. 13, the microprocessor 211 generates three sets of data transfer information 6001 through 6003 and continuously writes them as a transfer information list 6100 from a list base address (LPBA) of local memory 212. Into a chain flag field 608 of data transfer information 6001 and 6002, "1" is set, and into a chain flag field 608 of data transfer information 6003, "0" is set.

If the microprocessor 211 writes the sets of data transfer information 6001 through 6003 belonging to the transfer list 6100 into the local memory 212, then "1" is set into the LIP register 806 of data transfer LSI 500. By comparing "0" that was set into the LOP register 808 and "1" that was set into the LIP register 806, the data transfer LSI 500 detects that the data transfer information 600 was written into the local memory 212.

If the data transfer LSI 500 first reads the data transfer information 6001, data transfer processing is then conducted based upon this information. If the data transfer LSI 500 completes data transfer processing, the POP register 809 is incremented and set to "1". Because "1" has been set into the chain flag field 608 of the data transfer information 6001, the data transfer LSI 500 continuously reads the data transfer information 6002 and conducts similar data transfer processing.

As shown in FIG. 13, when the data transfer LSI 500 conducts data transfer based on the data transfer information 6002, the microprocessor 211 generates two sets of data transfer information 6004 and 6005 and writes them as a transfer information list 6200 into the local memory 212. In the present embodiment, because the data information list was designed to comprise the data transfer information 600 on the ordinal number (LNUM) that was set fixedly into the LNUM register 804, the data transfer information 6004 which is the leading data transfer information 600 belonging to the transfer information list 6200 becomes the data transfer information 600 with the (LNUM+1) from the list base address. Into the chain flag field 608 of data transfer information 6004, "1" is set, and into the chain flag field 608 of data transfer information 6005, "0" is set. If the microprocessor 211 writes those sets of data transfer information 6004 and 6005 into the local memory 212, the LIP register 806 of the data transfer LSI 500 is set to "2".

If the data transfer LSI 500 completes data transfer processing based on the data transfer information 6003, because the value that was set into the chain flag field 608 of the data transfer information 6003 is "0", a decision is made that the entire data transfer information 600 belonging to the transfer information list 6100 that was read initially has been processed. The data transfer LSI 500 uses "3" which is the value that was set into the identification information field 607 of the data transfer information 6003 or the value that was set into the POP register 809, generates the end status information 7001 which is the result of data transfer processing and writes it into the status base address (LSBA). The data transfer LSI 500 increments the STP register 807 to "1" and then writes "1" which is the value that was set into the STP register 807 into the status pointer address (LSIBA) of local memory 212. After processing the entire data transfer information 600 belonging to the transfer information list 6100, the data transfer LSI 500 increments the LOP register 808 and sets it to "1".

Meanwhile, the microprocessor 211 monitors the values written into the status pointer address, while conducting various processing. If the data transfer LSI 500 writes "1" into the status pointer address, the microprocessor 211 detects it, reads the status base address from the end status information 7001 and conducts processing corresponding to the end status.

Referring to FIG. 13, because the LIP register 806 of data transfer LSI 500 has been updated to "2", the data transfer LSI 500 further decides to conduct data transfer processing with respect to the next transfer information list, based on the difference with "1" that has been set in the LOP register 808. If the data transfer LSI 500 ends the data transfer processing based on the data transfer information 6004 and the data transfer processing based on the data transfer information 6005, it writes the end status information 7002 into the local memory 212. The end status information 7002 becomes the end status information 700 with an ordinal number 2 from the status based address (LSBA).

Other Embodiments

In the present embodiment, the microprocessor 211 used units to be written into the local memory 212 as the transfer information list units, but they can be also considered as data transfer information units. For example, when the LIP register 804 of data transfer LSI 500 serves as information indicating the ordinal number of a plurality of sets of data transfer information 600 stored in the local memory 212, and the microprocessor 211 writes a plurality of sequential sets of data transfer information 600, the microprocessor 211 sets the ordinal number with which the very last data transfer information 600 is written into the local memory 212. Further, the data transfer LSI 500 adds the data length of data transfer information 600 to the list base address of LOP register 808 at the ratio of LOP register 808 and reads the data transfer information 600 as the address for reading the data transfer information 600 from the local memory 212. The data transfer LSI 500 continues to read the data transfer information 600, while adding the data length of data transfer information 600 to the reading address, as long as the chain flag field 608 of the data transfer information 600 that was read out is "1". For example, as a result of such processing, the information relating to data transfer which is transmitted from the microprocessor 211 to data transfer LSI 500 becomes the data transfer information 600 unit, rather than transfer information list unit, and the variable-length data transfer information 600 can be transferred.

Further, in the present embodiment of the invention the data transfer information 600 was written into the local memory 212 managed by the microprocessor 211, but instead of the local memory 212, the data transfer information may be stored in a storage device similarly accessible by the microprocessor and data transfer LSI, such as the shared memory 220, cache memory 230, or other memory.

Furthermore, the present invention can be also implemented so as to be suitable for the disk control unit 240. For example, if the disk control unit 240 is assumed to comprise a microprocessor, a local memory, an interface for accessing the storage device 300, and a data transfer LSI, then data transfer processing similar to the data transfer processing in the above-described channel control unit 210 can be realized for data transfer processing relating to data to be transferred between the cache memory 230 and the storage device 300.

The exemplary embodiments of the present invention have been described above. These embodiments were, however, presented merely for facilitating the understanding of the present invention, and should not be construed as placing limitations on the present invention. The present invention can be changed or modified without departing from the essence thereof, and the present invention also includes the equivalents thereof.

What is claimed is:

1. A data transfer control system comprising:
   a channel control unit configured to be connected to an external device;
   a cache memory connected to the channel control unit; and
   a storage device control unit connected to the cache memory, the storage device control unit being configured to be connected to at least one storage device;
   wherein the channel control unit includes:
   a communication interface configured to be connected to the external device;
   a buffer memory;
   a local memory;
   a processor connected to the local memory;
   a DMA processor comprising a register whose access time is longer than access time of the local memory, and the DMA processor is connected with the processor via a bus and connected to the buffer memory;
   wherein the processor is configured to write data transfer information into the local memory based on a data transfer request from the external device, the data transfer information including a first address of the buffer memory and a second address of the cache memory which are to be set in the register of the DMA processor; and
   the DMA processor is configured to read the data transfer information from the local memory, to set the first and second addresses included in the data transfer information in the register of the DMA processor, and to transfer directly either data stored in the first address of the buffer memory into the second address of the cache memory or data stored in the second address of the cache memory into the first address of the buffer memory, according to the data transfer information.

2. The data transfer control system of claim 1, further comprising a shared memory connected with and shared by the DMA processor and the storage device control units, the shared memory being configured to store commands generated by the DMA processor and relating to control of data transfer based on the data transfer request from the external device.

3. The data transfer control system of claim 1, wherein the buffer memory is configured to store data to be transferred from or transferred to the external device.

4. The data transfer control system of claim 3, wherein:
   if the data transfer request read from the local memory by the DMA processor comprises a write command from the external device to write data from the external device to the second address of the cache memory, then the buffer memory is configured to store the data from the external device in the first address of the buffer memory before the date is transferred from the buffer memory to the cache memory by the DMA processor; and
   if the data transfer request read from the local memory by the DMA processor comprises a read command from the external device to read data from the second address of the cache memory, then the DMA processor is configured to transfer the data from the first address of the buffer memory to the external device after the data stored in the second address of the cache memory is transferred to the first address of the buffer memory.

5. The data transfer control system of claim 1, wherein the cache memory is configured to store data to be transferred from or transferred to a storage device.

6. The data transfer control system of claim 5, wherein:
   if the data transfer request read from the local memory by the DMA processor comprises a read command from the external device to read data from the storage device, then the cache memory is configured to store the data from the storage device before the data is transferred from the second address of the cache memory to the first address of the buffer memory by the DMA processor; and
   if the data transfer request read from the local memory by the DMA processor comprises a write command from the external device to write data from the external device to the storage device, then the DMA processor is configured to write the data in the second address of the cache memory before the data is transferred from the second address of the cache memory to the storage device.

7. The data transfer control system of claim 1, wherein the DMA processor comprises:
   a data transfer information fetch unit configured to read data transfer information stored in the local memory; and
   a data transfer processor configured to receive the data transfer information from the data transfer information fetch unit, and to transfer either the data stored in the first address of the buffer memory into the second address of the cache memory or the data stored in the second address of the cache memory into the first address of the buffer memory, according to the data transfer information.

8. The data transfer control system of claim 1, wherein the processor is configured to write data transfer information for a transfer information list into the local memory, the transfer information list including a plurality of sets of data transfer information based on a plurality of data transfer requests.

9. The data transfer control system of claim 8, wherein the processor is configured to set a chain flag for each set of data transfer information and include the chain flag in the set of data transfer information written into the local memory by the processor, the chain flag for each set of data transfer information indicating whether a next set of data transfer information on the transfer information list is to be processed or not.

10. The data transfer control system of claim 9,
wherein the DMA processor is configured to read the chain flag for the set of data transfer information;
wherein, if the chain flag indicates that a next set of data transfer information on the transfer information list is to be processed, then the DMA processor automatically reads the next set of data transfer information from the transfer information list in the local memory; and
wherein, if the chain flag indicates that no additional set of data transfer information on the transfer information list is to be processed, then the DMA processor writes results of data transfer as an end status information into the local memory.

11. The data transfer control system of claim 1, wherein the data transfer information includes an error detection code indicating whether an error is present in contents of the data transfer information.

12. The data transfer control system of claim 1, wherein the DMA processor is configured, after transferring the data, to write into the local memory an end status information representing result of transferring either the data stored in the first address of the buffer memory into the second address of the cache memory or the data stored in the cache memory into the buffer memory, according to the data transfer information.

13. The data transfer control system of claim 12, wherein the processor is configured to set identification information for the data transfer information; and wherein the end status information is associated with identification information used to identify the data transfer information.

14. The data transfer control system of claim 1, wherein the processor is configured to write data transfer information for a plurality of transfer information lists into the local memory, the transfer information lists each including a plurality of sets of data transfer information based on a plurality of data transfer requests.

15. The data transfer control system of claim 14, wherein the DMA processor includes a list write pointer which is updated each time the processor writes data transfer information belonging to a transfer information list into the local memory, and a list read pointer which indicates a number of the transfer information lists comprising the data transfer information which is read by the DMA processor; and wherein the DMA processor is configured to read data transfer information from a next transfer information list as long as the list write pointer is greater than the list read pointer.

16. A method for controlling data transfer, the method comprising:
receiving a data transfer request from an external device;
writing data transfer information based on the data transfer request into a local memory by a processor, the data transfer information including a first address of a buffer memory and a second address of a cache memory which are to be set in a register of a DMA processor which is connected with the processor via a bus wherein access time of the register is longer than access time of the local memory;
reading the data transfer information from the local memory by the DMA processor;
setting the first and second addresses included in the data transfer information in the register of the DMA processor by the DMA processor; and
transferring either the data stored in the first address of the buffer memory into the second address of the cache memory or the data stored in the second address of the cache memory into the first address of the buffer memory, according to the data transfer information, by the DMA processor.

17. The method of claim 16, wherein the buffer memory is configured to store data to be transferred from or transferred to the external device.

18. The method of claim 17, further comprising:
if the data transfer request read from the local memory by the DMA processor comprises a write command from the external device to write data from the external device to the second address of the cache memory, storing the data from the external device in the first address of the buffer memory before the data is transferred from the first address of the buffer memory to the second address of the cache memory by the DMA processor; and
if the data transfer request read from the local memory by the DMA processor comprises a read command from the external device to read data from the second address of the cache memory, transferring the data from the first address of the buffer memory to the external device by the DMA processor after the data stored in the second address of the cache memory is transferred to the first address of the buffer memory.

19. The method of claim 16, wherein the cache memory is configured to store data to be transferred from or transferred to a storage device.

20. The method of claim 19, wherein:
if the data transfer request read from the local memory by the DMA processor comprises a read command from the external device to read data from the storage device, storing the data from the storage device in the second address of the cache memory before the data is transferred from the second address of the cache memory to the first address of the buffer memory by the DMA processor; and
if the data transfer request read from the local memory by the DMA processor comprises a write command from the external device to write data from the external device to the storage device, writing the data in the second address of the cache memory by the DMA processor before the data is transferred from the second address of the cache memory to the storage device.

21. The method of claim 16, wherein the DMA processor comprises:
a data transfer information fetch unit configured to read data transfer information stored in the local memory; and
a data transfer processor configured to receive the data transfer information from the data transfer information fetch unit, and to transfer either the data stored in the first address of the buffer memory into the second address of the cache memory or the data stored in the second address of the cache memory into the first address of the buffer memory, according to the data transfer information.

22. The method of claim 21, wherein the data transfer processor comprises a direct memory access processor.

23. The method of claim 16, wherein writing data transfer information comprises writing data transfer information for a transfer information list into the local memory by the processor, the transfer information list including a plurality of sets of data transfer information based on a plurality of data transfer requests.

24. The method of claim 23, wherein writing data transfer information comprises setting a chain flag for each set of data transfer information by the processor and including the chain flag in the set of data transfer information written into the local memory by the processor, the chain flag for each set of data transfer information indicating whether a next set of data transfer information on the transfer information list is to be processed or not.

25. The method of claim 24,
wherein reading the data transfer information from the local memory by the DMA processor comprises reading the chain flag for the set of data transfer information;
wherein, if the chain flag indicates that a next set of data transfer information on the transfer information list is to be processed, automatically reading the next set of data transfer information from the transfer information list in the local memory by the DMA processor; and
wherein, if the chain flag indicates that no additional set of data transfer information on the transfer information list is to be processed, writing results of data transfer as an end status information into the local memory by the DMA processor.

26. The method of claim 16, wherein the data transfer information includes an error detection code indicating whether an error is present in contents of the data transfer information.

27. The method of claim 16, further comprising, after transferring the data by the DMA processor, writing into the local memory by the DMA processor an end status information representing result of transferring either the data stored in the first address of the buffer memory into the second address of the cache memory or the data stored in the second address of the cache memory into the first address of the buffer memory, according to the data transfer information.

28. The method of claim 27, wherein writing the data transfer information comprises setting identification information for the data transfer information by the processor; and wherein the end status information is associated with the identification information used to identify the data transfer information.

29. The method of claim 16, wherein writing data transfer information comprises writing data transfer information for a plurality of transfer information lists into the local memory by the processor, each transfer information list including a plurality of sets of data transfer information based on a plurality of data transfer requests.

30. The method of claim 29, wherein the DMA processor includes a list write pointer which is updated each time the processor writes data transfer information belonging to a transfer information list into the local memory, and a list read pointer which indicates a number of the transfer information lists comprising the data transfer information which is read by the DMA processor; and wherein reading the data transfer information from the local memory by the DMA processor comprises reading data transfer information from a next transfer information list as long as the list write pointer is greater than the list read pointer.

* * * * *